(No Model.) 2 Sheets—Sheet 1.
R. M. HUNTER.
ELECTRIC RAILWAY.
No. 382,877. Patented May 15, 1888.
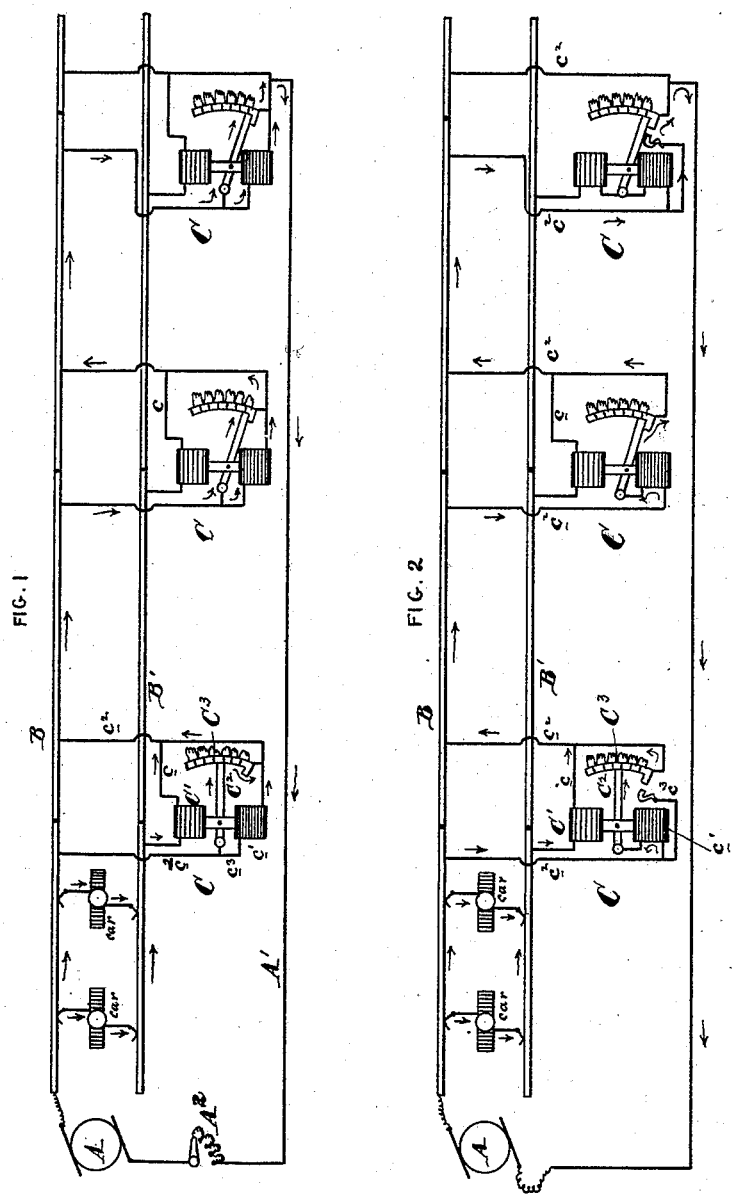
Attest:
Henry Drury
E. M. Brickinead
Inventor:
R. M. Hunter (No Model.) 2 Sheets—Sheet 2.
R. M. HUNTER.
ELECTRIC RAILWAY.
No. 382,877. Patented May 15, 1888.
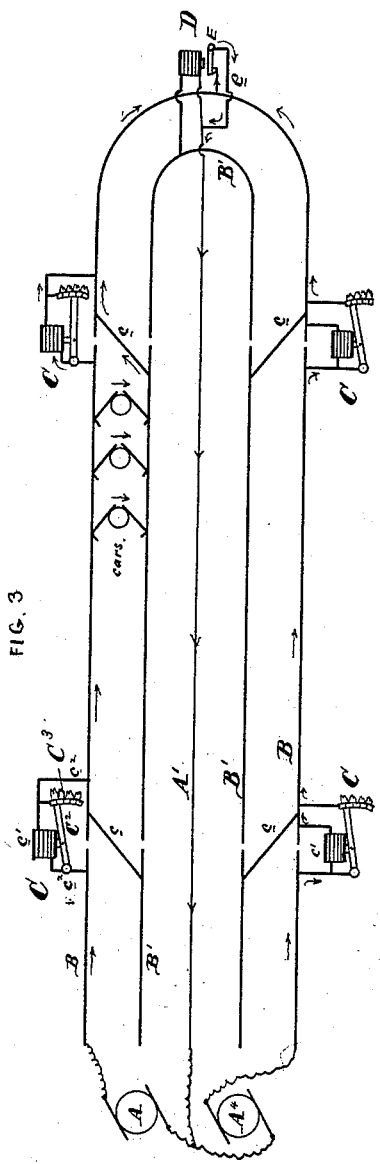
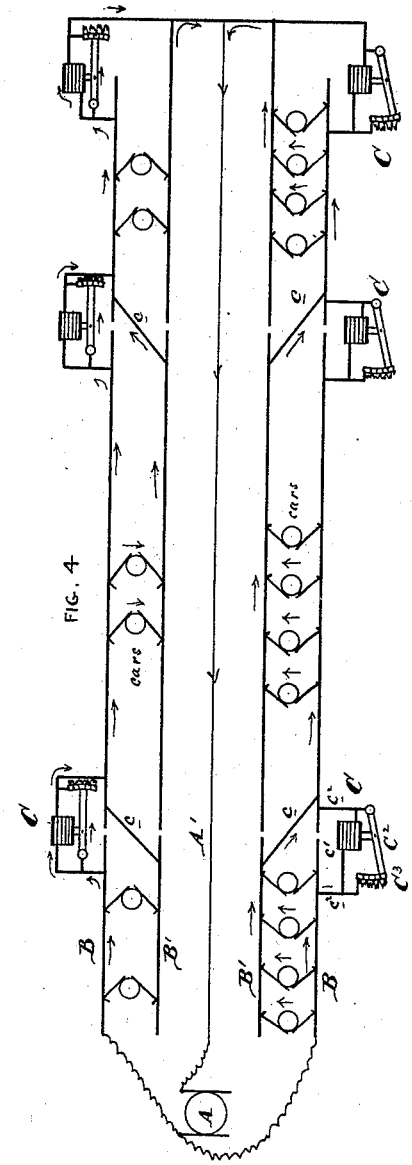
Attest:
Inventor:

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRIC RAILWAY.

SPECIFICATION forming part of Letters Patent No. 382,877, dated May 15, 1888.

Original application filed July 19, 1886. Serial No. 208,418. Divided and this application filed September 5, 1887. Serial No. 248,790. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to the construction and operation of electric railways; and it consists in certain improvements, fully set forth in the following specification, and shown in the accompanying drawings, which form part thereof.

The object of my invention may be enumerated as follows:

First. To provide an electric railway embodying the system such as set out in my application, Serial No. 192,187, and filed February 17, 1886, wherein the conductors are made in sections and coupled up in such a manner that the motors on one section are in series with those on the next and in which two motors on one section are coupled in multiple arc, with suitable means whereby the current passing through the motors on a section shall be in accordance with the requirement—that is to say, if one motor is on a section then all of the current except enough for that one motor is caused to pass down the line without passing through the motor, being shunted around it. If two motors are on the section, then twice the current passes through the motors, but the same amount through each motor, as in the first instance, and so on.

Second. To enable in a system such as above specified a motor to be cut out of circuit without in any way interfering with the current passing down the line and without requiring any of the current to pass through the motors. It is important to have an automatic regulator independent of the motor, as in a series system any derangement of the shunt-circuits over the car or motor would affect the current in the line, and consequently all the motors in circuit would be made to feel this defect without power to overcome it. With an automatic regulator for the sections and independent of the motors such trouble would not arise, as the regulator would not be handled and there would be no uncertain contacts for the connecting conductors such as would exist with a car or motor standing still.

Third. To couple up electric-railway conductors of a series multiple system, so that the positive conductors at the terminals are connected to the positive poles of two generators and the negative poles at the other terminals if the road be two parallel tracks, or middle of the negative conductor if the track be continuous, with the negative poles of the generators, whereby the current may be distributed uniformly over the entire line.

The foregoing will give the main features of my invention, and which are more specifically referred to hereinafter.

This application is a division of my application, Serial No. 208,418, and filed July 19, 1886.

In the drawings, Figure 1 is a diagram illustrating the construction of my improved system of electric-railway circuits. Fig. 2 is a similar view of a modification of same. Fig. 3 is a diagram showing a method of coupling up two generators with double-line conductors; and Fig. 4 is a modification showing two circuits, substantially such as shown in Figs. 1 and 2, coupled with the same return-conductor and a single generator.

A is the dynamo-electric machine or generator for supplying electricity to the working or line conductors.

B and B' are the two lines of working-conductors, and are preferably made in sections. One pole of the generator is connected with the end of one of the sectional conductors B, and the other end of the corresponding conductor-section, B', is connected by wire $c$ with adjacent ends of the next conductor-section B, and so on, as set out and claimed in my application filed February 17, 1886, Serial No. 192,187. The return-conductor A' connects the other poles of the generator with the other end of the line through a regulator, C, such as between the various sections. The wire $c$ is in circuit with a helix, C', which through its armature or core operates a lever, $C^2$, to cut in or out more or less of the resistances $C^3$ in a bridging-circuit, $c^2$, between the two adjacent ends of the conductor-sections B. This may be used pure and simple, as above set out, or may be combined with a high-resistance helix, $c'$, in a shunt-circuit, $c^3$, to oppose the action of the helix C'. The object of this construction (shown in Fig. 1) is to provide suitable means by which the current required to pass through the motors $B^2$ on one section may be automatically controlled, so that only part of the full current passes through a motor. If the capacity be for five motors or trains to a section, then when five motors or trains are on the section the full current will be divided among them. It will also be seen that by providing such automatic controlling device C that if one section have one motor and the next section four motors the current will be divided, (all passing down the line,) so that each motor receives the same strength of current.

In the modification shown in the left-hand part of Fig. 2 the high-resistance helix $c'$ is arranged in the bridging-circuit, and is cut out by shunt $c^3$ when no motors are on its section and when all of the line-current must pass to the next section B. In the construction shown in the middle of Fig. 2 the shunt $c^3$ is dispensed with and the high-resistance helix is changed to a low-resistance helix. In the modification shown on the right-hand part of Fig. 2 the current which passes through the resistance is caused to pass from conductor B to B', or to the helix C'. Otherwise it is the same as in the first instance. The return-conductor A' is connected with the distant end of the line, as in the case of Fig. 1, through one of the regulators or the last conductor-section, B.

In Fig. 3 is shown another modification, in which the helix C' is omitted and the high-resistance helix $c'$ on the shunt $c^3$ is made to move the lever $C^2$, to vary the resistance in the bridging-circuit connecting the adjacent ends of conductors B. The return-connection in this figure is made with conductor A' by a magnet, D, in the said conductor A', which actuates an armature, E, controlling a shunt-circuit, $e$, between the conductor A' and working-conductor B of the line. The return-conductor A' is connected with the corresponding working-conductor, B', of the line. Normally the current from the conductor B passes through the armature E and shunt-circuit $e$ to return-conductor A'; but when a motor comes upon these sections of the conductors B and B' the magnet D is energized and attracts its armature and the current passes through the motors from B to B', then through magnet D to return-conductor A. This is only one type of connection. These regulators may be made in a large number of ways; hence I do not limit myself to any particular form of device. The line-current may be controlled at the home station by a resistance-changer, $A^2$, or otherwise.

Referring now to Fig. 3, we have two generators, A $A^4$, the positive pole of each being connected to the ends of one line of working-conductors, and the other two or negative poles of the generators are connected together and with the middle of the other line of working-conductors, whereby the resistance of the line is equal for various positions of the motors. In this construction we have simply a construction of two of the lines, such as shown in Figs. 1 and 2, coupled so as to use a common return-conductor. The same result would be obtained if only one generator were used and its current divided with the two terminals, as shown in Fig. 4. It is also evident that while I have shown a continuous line looped in the middle that this may be a double line arranged parallel, as also indicated in Fig. 4.

In a double or return track the resistance would be very great and would require too large a section; hence by coupling the two circuits up, as shown in Figs. 3 and 4, the resistance is halved and the size of the generators reduced greatly, and the resistance on each line will be the same. This looped track is suitable to any other system as well as that shown.

I do not limit myself to the specific details here shown, as they may be modified in various ways without departing from the spirit of my invention.

The employment of two separate generators for supplying separate railways or sections of railways located at one place or central station is not broadly claimed in this application, as it forms subject-matter of my application, No. 256,915, of 1887.

Having now described my invention, what I claim as new, and desire to secure by Letters Patent, is—

1. The combination of two lines of working-conductors made in sections, the sections of one line being connected together through resistances, and sections of the other lines being connected with the sections of the first-mentioned line, and a generator of electricity connecting with opposite ends of the respective lines, whereby motors upon the line may be coupled in series with each other, substantially as and for the purpose specified.

2. The combination of two lines of working-conductors made in sections of a length sufficient to accommodate two or more motors or trains, the sections of one line being connected together through resistances, and sections of the other line being connected with the sections of the first-mentioned line, a generator of electricity connecting with opposite ends of the respective lines, whereby motors upon the various sections of the line may be coupled in series with each other and those upon the corresponding sections may be coupled in multiple arc, substantially as and for the purpose specified.

3. The combination of two lines of working-conductors made in sections, the sections of one line being connected together through resistances, means to adjust said resistances, and sections of the other line being connected with the sections of the first-mentioned line, a generator of electricity connecting with opposite ends of the respective lines, whereby motors upon the line may be coupled in series with each other, substantially as and for the purpose specified.

4. The combination of two lines of working-conductors made in sections, the sections of one line being connected together through resistances, automatic devices controlled by the current in the line to adjust said resistances, sections of the other line being connected with the sections of the first-mentioned line, and a generator of electricity connecting with opposite ends of the respective lines, whereby motors upon the line may be coupled in series with each other, substantially as and for the purpose specified.

5. The combination of two lines of working-conductors made in sections, the sections of one line being connected together through resistances, automatic devices controlled by the current passing through the motors to adjust said resistances, and sections of the other line being connected with the sections of the first-mentioned line, and a generator of electricity connecting with opposite ends of the respective lines, whereby motors upon the lines may be coupled in series with each other, substantially as and for the purpose specified.

6. The combination of two lines of working-conductors made in sections, the sections of one line being connected together through resistances, automatic devices controlled by the current passing through both the line and the motors to adjust said resistances, and sections of the other line being connected with the sections of the first-mentioned line, and a generator of electricity connecting with opposite ends of the respective lines, whereby motors upon the line may be coupled in series with each other, substantially as and for the purpose specified.

7. The combination of two lines of working-conductors made in sections of a length sufficient to accommodate two or more motors or trains, the sections of the one line being connected together through resistances, automatic devices controlled by the current in the line to adjust said resistances, and sections of the other line being connected with the sections of the first-mentioned line, and a generator of electricity connecting with opposite ends of the respective lines, whereby motors upon the various sections of the line may be coupled in series with each other, and those upon the corresponding sections may be coupled in multiple arc, substantially as and for the purpose specified.

8. The combination of two lines of working-conductors made in sections of a length sufficient to accommodate two or more motors or trains, the sections of one line being connected together through resistances, automatic devices controlled by the current passing through the motors to adjust said resistances, the sections of the other line being connected with the sections of the first-mentioned line, a generator of electricity connecting with opposite ends of the respective lines, whereby motors upon the various sections of the line may be coupled in series with each other, and those upon the corresponding sections may be coupled in multiple arc, substantially as and for the purpose specified.

9. The combination of two lines of working-conductors made in sections of a length sufficient to accommodate two or more motors or trains, the sections of the one line being connected together through resistances, automatic devices controlled by the current passing through both the line and the motors to adjust said resistances, sections of the other line being connected with the sections of the first-mentioned line, and a generator of electricity connecting with opposite ends of the respective lines, whereby motors upon the various sections of the line may be coupled in series with each other, and those upon the corresponding sections may be coupled in multiple arc, substantially as and for the purpose specified.

10. The combination of two lines of working-conductors made in sections, the sections of one line being connected together through resistances, sections of the other line being connected with the sections of the first-mentioned line, a generator of electricity connecting with opposite ends of the respective lines, whereby motors upon the line may be coupled in series with each other, and means to control the line-current, substantially as and for the purpose specified.

11. The combination of two lines of working-conductors made in sections of a length sufficient to accommodate two or more motors or trains, the sections of the one line being connected together through resistances, sections of the other line being connected with the sections of the first-mentioned line, a generator of electricity connecting with opposite ends of the respective lines, whereby motors upon the various sections of the line may be coupled in series with each other, those upon the corresponding sections may be coupled in multiple arc, and means to control the line-current, substantially as and for the purpose specified.

12. The combination of two lines of working-conductors made in sections, the sections of one line being connected together through adjustable resistances, and the sections of the other line being connected by branches with the sections of the first-mentioned line, so as to connect motors on the respective sections of the line in series, a regulating device for varying said resistances, consisting of an electro-magnet in said branch, and a resistance-changer actuated by said magnet, substantially as and for the purpose specified.

13. The combination of two lines of working-conductors made in sections, the sections of one line being connected together through adjustable resistances, and the sections of the other line being connected by branches with the sections of the first-mentioned line, so as to connect motors on the respective sections of the lines in series, a regulating device for varying said resistances, consisting of an electro-magnet in circuit with adjacent sections of the first-mentioned line, and an electro-magnet in said branch, and a resistance-changer actuated by said magnet, substantially as and for the purpose specified.

14. The combination of two lines of working-conductors made in sections, the sections of one line being connected together through adjustable resistances, the sections of the other line being connected by branches with the section of the first-mentioned line, so as to connect motors on the respective sections of the lines in series, a regulating device for varying said resistances, consisting of an electro-magnet of high resistance in circuit with adjacent sections of the first-mentioned line, and an electro-magnet of low resistance in said branch, and a resistance-changer actuated by said magnets, substantially as and for the purpose specified.

15. The combination of two lines of working-conductors made in sections, the sections of one line being connected together through adjustable resistances, the sections of the other line being connected by branches with the sections of the first-mentioned line, so as to connect motors on the respective sections of the lines in series, a regulating device for varying said resistances, consisting of an electro-magnet in circuit with adjacent circuit-sections of the first-mentioned line, and a resistance-changer actuated by said magnet, substantially as and for the purpose specified.

16. The combination of two lines of working-conductors made in sections, the sections of one line being connected together through adjustable resistances, the sections of the other line being connected by branches with the sections of the first-mentioned line, so as to connect motors on the respective sections of the lines in series, a regulating device for varying said resistances, consisting of an electro-magnet in circuit with adjacent sections of the first-mentioned line, a resistance-changer actuated by said magnet, and a shunting device to put the magnet in a shunt-circuit when the resistance is cut out, substantially as and for the purpose specified.

17. The combination of two lines of working-conductors made in sections, the sections of one line being connected together through adjustable resistances, the sections of the other line being connected by branches with the section of the first-mentioned line, so as to connect motors on the respective sections of the lines in series, a regulating device for varying said resistances, consisting of an electro-magnet of high resistance in circuit with adjacent sections of the first-mentioned line, an electro-magnet of low resistance in said branch, a shunting device to put the high-resistance magnet in a shunt-circuit when the resistance between the sections of the first-mentioned line is cut out, and a resistance-changer actuated by said magnets, substantially as and for the purpose specified.

18. In an electric railway, two lines of working-conductors divided into sections and having their sections connected in pairs, including one section from each line, and such successive pairs of sections connected in series, so as to couple motors on the successive sections of the lines in series, and motors on the corresponding sections of each line in multiple arc, in combination with one or more electric motors, and a bridging-circuit to shunt more or less of the line-current around the motors on the said corresponding sections, whereby the current passing through the motors may be in accordance with the requirements, substantially as and for the purpose specified.

19. In an electric railway, two lines of working-conductors divided into sections and having their sections connected in pairs, including one section from each line, and such successive pairs of sections connected in series, so as to couple motors on the successive sections of the lines in series, and motors on the corresponding sections of each line in multiple arc, in combination with one or more electric motors, a bridging-circuit to shunt more or less of the line current around the motors on the said corresponding sections, and an adjustable resistance device in said bridging or shunt circuit and governed by the current flowing through the motors, to the end that the current passing through the motors may be in accordance with the requirements, substantially as and for the purpose specified.

20. In an electric railway, two lines of working-conductors divided into sections and having their sections connected in pairs, including one section from each line, and such successive pairs of sections connected in series, so as to couple motors on the successive sections of the lines in series, and motors on the corresponding sections of each line in multiple arc, in combination with one or more electric motors, a bridging-circuit to shunt more or less of the line-current around the motors on the said corresponding sections, and an electrically-actuated adjustable resistance device in said bridge or shunt circuit and governed by the current flowing through the motors, to the end that the current passing through the motors may be in accordance with the requirements, substantially as and for the purpose specified.

21. In an electric railway, two lines of working-conductors divided into sections and having their sections connected in pairs, including one section from each line, and such successive pairs of sections connected in series, so as to couple motors on the successive sections of the lines in series, and motors on the corresponding sections of each line in multiple arc, in combination with one or more electric motors, a bridging-circuit to shunt more or less of the line-current around the motors on the said corresponding sections, an adjustable resistance-changer in said bridge or shunt circuit and in multiple-arc connection with the motors on the corresponding sections of the lines, and controlled by the motor-resistance, whereby the current passing through the motors may be in accordance with the requirements, substantially as and for the purpose specified.

22. In an electric railway, two lines of working-conductors divided into sections and having their sections connected in pairs, including one section from each line, and such successive pairs of sections connected in series, so as to couple the motors on the successive sections of the lines in series, and motors on the corresponding sections of each line in multiple arc, in combination with one or more electric motors, a bridging-circuit, a resistance-changer in said bridging-circuit to shunt more or less of the line-current around the motors on the said corresponding sections, whereby the current passing through the motors may be in accordance with the requirements, and a regulator to control the current passing through all of the sections simultaneously, substantially as and for the purpose specified.

23. In an electric railway, two lines of working-conductors divided into sections and having their sections connected in pairs, including one section from each line, and such successive pairs of sections connected in series, so as to couple motors on the successive sections of the lines in series, and motors on the corresponding sections of each line in multiple arc, in combination with one or more electric motors, a bridging-circuit to shunt more or less of the line-current around the motors on the said corresponding sections, an electrically-actuated adjustable resistance device in said bridge or shunt circuit, and governed by the current flowing through the motors, to the end that the current passing through the motors may be in accordance with the requirements, and a regulator to control the current passing through all of the sections simultaneously, substantially as and for the purpose specified.

24. In an electric railway, two lines of working-conductors divided into sections and having their sections connected in pairs, including one section from each line, and such successive pairs of sections connected in series, so as to couple motors on the successive sections of the lines in series, and motors on the corresponding sections of each line in multiple arc, a bridging-circuit to shunt more or less of the line-current around the motors on the said corresponding sections, an electrically-actuated adjustable resistance device in said bridge or shunt circuit, and governed by the current flowing through the motors, to the end that the current passing through the motors may be in accordance with the requirements, and a regulator to control the current passing through all of the sections simultaneously, substantially as and for the purpose specified.

25. In an electric railway, a line-working conductor divided into sections arranged end to end in line, in combination with a bridging-conductor connecting the said sections end to end in the same line, and a resistance in said bridging-conductor, substantially as and for the purpose specified.

26. In an electric railway, a line-working conductor divided into sections, in combination with a bridging-conductor connecting the said sections end to end, and a variable resistance in said bridging-conductor, substantially as and for the purpose specified.

27. In an electric railway, a line-working conductor divided into sections, in combination with a bridging-conductor connecting the said sections end to end, a variable resistance in said bridging-conductor, and an automatic device to vary said resistance, substantially as and for the purpose specified.

28. In an electric railway, two lines of working-conductors made in sections, in combination with traveling electromotors receiving electricity therefrom, branch conductors connecting one section of one line with the next section of the other line, electrical connections between the sections of one line, an electric generator, and connections between one of the poles of said generator and the nearest end of one of the line-conductors, and the other pole and the farthest end of the other line-conductor, whereby the resistance from the generator through a motor and return shall be practically uniform for all positions of the motor upon the line, substantially as and for the purpose specified.

29. The combination of two portions of a series multiple electric-railway circuit and an automatic variable-resistance shunting device, substantially as set out, between the two portions of the railway to shunt more or less current around the motors on one portion of the railway and deliver it to the other portion of the railway, with two generators having similar poles coupled to the same line-conductor, but on opposite ends thereof, and having the other and similar poles coupled to the other working-conductor at a distance from the terminals of the first-mentioned working-conductor, substantially as and for the purpose specified.

30. The combination of two portions of a series multiple electric-railway circuit and an automatic variable-resistance shunting device, substantially as set out, between the two portions of the railway to shunt more or less current around the motors on one portion of the railway and deliver it to the other portion of the railway, with two generators having similar poles coupled to the same line-conductor, but on opposite ends thereof, having the other and similar poles coupled to the other working-conductor at a point midway between the terminals of the working-conductors, whereby the resistance to the passage of the current shall be equal for all positions of the motors on the line, and the total resistance of the line shall be greatly reduced, substantially as and for the purpose specified.

In testimony of which invention I hereunto set my hand.

RUDOLPH M. HUNTER.

Witnesses:
E. M. BRECKINREED,
HARRY G. CLARK.